Patented Feb. 9, 1954

2,668,865

UNITED STATES PATENT OFFICE 2,668,865

ALKYLATION OF ISOPARAFFINS WITH NAPHTHENES

Abraham Schneider, Philadelphia, Pa., assignor to Sun Oil Company, Philadelphia, Pa., a corporation of New Jersey No Drawing. Application February 28, 1950, Serial No. 146,925

13 Claims. (Cl. 260—666)

This invention relates to a process for the preparation of polyalkylcyclohexanes by the reaction between isoparaffins and alkyl substituted cyclopentane under novel catalytic conditions.

The alkylation of olefins by isoparaffins using catalysts such as sulfuric or hydrofluoric acids, usually at temperatures of from $-10°$ C. to $30°$ C., is well known. Also, the reaction between methylcyclopentane and olefins such as butenes in the presence of HF to form polyalkylcyclohexanes has been described. Such processes are subject to the disadvantage of the requirement of a large excess of olefins to obtain substantial yields, and by the simultaneous and preponderant occurrence of other reactions. For example, in the described alkylation of olefins with methylcyclopentane, only a small yield of the desired product is obtained because of the prominence of other reactions, including polymerization, depolymerization, and dealkylation, which reactions produce a large and complex variety of products.

An object of the present invention is to provide a process for the direct alkylation of isoparaffins with alkyl substituted cyclopentanes. Another object is to eliminate the necessity for large quantities of olefins, heretofore required to obtain substantial yields, in alkylations involving alkyl substituted cyclopentanes. A further object is to provide a rapid and commercially feasible process for the production of polyalkylcyclohexanes in good yield. A still further object is the removal of naphthenes, such as methylcyclopentane, from a mixture of hydrocarbons boiling in the gasoline range. Other objects appear hereinafter.

It has now been discovered that by admixing hydrogen fluoride and an olefin in the presence of an alkyl substituted cyclopentane and an isoparaffin having at least one tertiary hydrogen atom per molecule, a reaction comprising the selective alkylation of the isoparaffin by the naphthene occurs.

The process of the present invention comprises bringing together hydrogen fluoride and an olefin in the presence of an alkyl substituted cyclopentane and an isoparaffin having at least one tertiary hydrogen atom per molecule. The hydrogen fluoride and olefin, when so contacted, establish a catalytic condition effective to cause the alkyl substituted cyclopentane to alkylate the isoparaffin to form polyalkylcyclohexanes. It is characteristic of the present process that a large proportion of the olefin is converted to the corresponding paraffin. The process of the present invention thus eliminates the necessity for excessive quantities of olefins, otherwise necessary to obtain substantial yields, the present requirement being only for catalytic quantities, hereinafter described.

In performing the process of the present invention, it is essential that the hydrogen fluoride and the olefin be mixed, or contacted, only in the presence of both the substituted cyclopentane and the isoparaffin, since otherwise polymerization of the olefin or other reactions occur which destroy the catalytic condition necessary for the reaction between the isoparaffin and alkyl substituted cyclopentane. It is preferred to add the olefin to a stirred emulsion of the alkyl substituted cyclopentane and isoparaffin in hydrogen fluoride. In this manner, polymerization of the olefin, which would otherwise be caused by the presence of HF, is prevented.

The mechanism of the present reaction is not known with certainty, and it is not desired to be limited by theoretical considerations. The overall reaction, however, whereby alkyl substituted cyclopentanes alkylate isoparaffins under the catalytic influence of hydrogen fluoride and an olefin, and wherein the olefin forms the corresponding paraffin, may be represented as follows, using methylcyclopentane and isopentane as illustrative of the reactants, and propylene as illustrative of olefins:

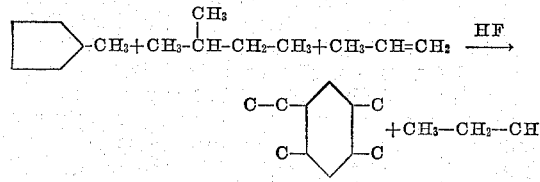

Cyclopentanes which may be employed in the present process are the alkyl substituted cyclopentanes. Methylcyclopentane is a preferred reactant. Other substituted cyclopentanes which may be employed with good results include ethylcyclopentane, normal and isopropyl cyclopentane, 1,2- and 1,3-dimethylcyclopentane and isomers thereof, trimethylcyclopentanes, 1-methyl-2-ethylcyclopentane, 1,2,3,4,5-pentamethylcyclopentane, and homologues and isomers of the mentioned compounds.

The isoparaffins which may be employed are those having at least one tertiary carbon atom per molecule. It is preferred to employ isoparaffins of from 4 to 6 carbon atoms. Higher molecular weight isoparaffins will give some product, but other reactions predominate to give a complex mixture of products the separation of which is difficult. Isobutane and isopentane are the preferred isoparaffins to employ, but branched chain paraffins of six carbon atoms, such as 2-methylpentane, 3-methylpentane, 2,3-dimethylbutane, and 2-ethylbutane may be employed with good results. Isoparaffins having more than 6 carbon atoms and at least one tertiary hydrogen atom per molecule, may be employed, as described, but the rate of reaction therewith is slow and a mixture of a wide variety of products other than the desired polyalkylcyclohexane is obtained.

Olefins which may be employed in the present process are the monoolefins such as propene, butene-1, butene-2, isobutene, the pentenes, hexenes, heptenes, and the like. Propene, butene-1, and butene-2 are the preferred olefins to employ, and it is further preferred to employ olefins other than tertiary olefins. By the expression "tertiary olefins" is meant an olefin in which one of the unsaturated carbon atoms has two alkyl substituents, while the other unsaturated carbon atom has no more than one alkyl substituent. It has been found that such olefins may alkylate the cyclopentane reactant to an appreciable extent, whereas the preferred olefins which do not have this configuration do not alkylate to any appreciable extent, but form the corresponding paraffin in the reaction.

An exception to the above-described preferred olefins is the use of a tertiary olefin, such as isobutene, in a process employing, as the isoparaffin, the hydrocarbon having the same carbon skeleton as the olefin. In this case, the olefin is converted to the hydrocarbon being alkylated by the alkyl substituted cyclopentane, and hence, may enter the reaction. This use of a tertiary olefin and the corresponding isoparaffin results in a good yield of the desired product, and forms a preferred embodiment of the present invention.

The temperature to employ is advantageously about room temperature but may vary from about $-10°$ C. to about $100°$ C., and preferably from $0°$ C. to $30°$ C. The reaction is somewhat exothermic, but the rise of temperature on slow addition of the olefin, the preferred method of reaction, to the reaction mixture is only slight, and hence ambient temperature may be employed, i. e., in general, control of temperature is unnecessary. The pressure to employ is not critical, the only requirement being that it be sufficient to maintain the reactants in the liquid state. Using the preferred reactants, the pressure will usually be from 30 to 100 p. s. i. g.

The concentrations of the reaction mixture components may be varied considerably and good results obtained therewith. The molar ratio of olefin to alkyl substituted cyclopentane should be within the range of from 0.1 to 2, and preferably should be within the range of from 0.2 to 1. At lower ratios, the desired reaction does not occur to the desired extent, whereas at higher ratios reactions involving the olefin become appreciable. The molar ratio of isoparaffin to alkyl substituted cyclopentane should be from 1 to 30, and preferably from about 2 to 5. In general, an excess of isoparaffin is desirable to insure complete consumption of the substituted cyclopentane. It is preferred to employ a volume of hydrogen fluoride substantially equal to the total hydrocarbon volume, but the ratio may be varied from 0.1 to 5, and preferably from 0.25 to 2, with good results.

The process of the present invention is not suitable for the alkylation of isoparaffins with alkyl substituted cyclohexanes. The catalytic condition established by contacting an olefin and hydrogen fluoride in the presence of an isoparaffin and an alkyl substituted cyclohexane is ineffective to cause alkylation of the isoparaffin by the cyclohexane to an appreciable extent; reactions such as alkylation of the olefin by the isoparaffin, polymerization of the olefin, disproportionation of the isoparaffin, and the like, predominate.

To illustrate a preferred embodiment of the present invention, an olefin is slowly added to a stirred emulsion of HF, methylcyclopentane and an isoparaffin having from 4 to 6 carbon atoms and at least one tertiary hydrogen atom per molecule, such as isopentane. On such addition, a catalytic condition is established whereby the methylcyclopentane alkylates the isoparaffin to the substantial exclusion of alkylation by the added olefin, which is converted in the reaction to the corresponding paraffin. On consumption of the methylcyclopentane to form, with the isoparaffin, polyalkylcyclohexanes, the olefin will alkylate the isoparaffin, and hence it is desirable to stop the reaction, or the addition of olefin, at approximately the time at which all of the methylcyclopentane is consumed.

A further preferred embodiment comprises contacting hydrogen fluoride and olefin in the presence of a straight run petroleum gasoline fraction containing both naphthenes, such as methylcyclopentane and the dimethylcyclopentanes, and isoparaffins. In some instances the presence of such naphthenes in such fractions is undesirable, such as where the fraction is to be subjected to isomerization. It is impractical to separate such naphthene by distillation, because its boiling point is approximately the same as one or more of the other hydrocarbons present. By the present process, the naphthene is converted to polyalkylcyclohexanes, which may easily be separated by distillation, thereby removing the naphthene and simultaneously forming a valuable product.

The following examples illustrate preferred embodiments of the present invention:

Example 1

To a stirred mixture of hydrogen fluoride, isopentane and methylcyclopentane was added propene over a period of 15 minutes at ambient temperature (about $23°$ C.). The quantities of reactants and catalysts are given in the table below. The mixture warmed slightly during the process. The HF layer was removed by decantation; there was no sludge and the acid was only slightly tinted brown. The organic layer was washed with water, distilled, and the distillates analyzed. Results are given in the table below:

|  | Grams | Moles |
|---|---|---|
| Reactants: | | |
| Methylcyclopentane | 52 | 0.62 |
| Isopentane | 133 | 1.85 |
| Catalysts: | | |
| Hydrogen fluoride | 133 | 6.65 |
| Propene | 25.5 | 0.628 |
| Total | 343.5 | |
| Products: | | |
| Hydrogen fluoride layer | 132.5 | |
| Propane | 8.1 | 0.19 |
| Isopentane | 100.9 | 1.41 |
| Methylcyclopentane | 21.1 | 0.251 |
| Alkylated product [1] | 13.9 | 0.09 |
| Other hydrocarbons | 23 | |
| Residue | 7 | |

[1] Consisted of a mixture of ethyltrimethylcyclohexanes, such as 1-ethyl-2,3,6-trimethylcyclohexane.

Example 2

Following the procedure given in Example 1, isobutene was contacted hydrogen fluoride in the presence of methylcyclopentane and isobutane; the quantities of reactants, catalysts, and products are given in the following table.

In these alkylations, relatively large amounts of olefin, as compared to the amounts of methylcyclopentane, were employed in order to demonstrate the alkylation of the isoparaffin by the naphthene to substantially complete consumption of the naphthene, which reaction occurs in preference to the heretofore known alkylation of olefin by isoparaffin. On complete consumption of the naphthene, this latter alkylation occurs.

|  | Reaction 1 | Reaction 2 | Reaction 3 |
|---|---|---|---|
| Reagents: |  |  |  |
| Methylcyclopentane, g. (moles) | 10 (0.119) | 42.5 (0.51) | 86.5 (1.03) |
| Isobutane, g. (moles) | 213 (3.67) | 117 (2.02) | 167.5 (2.89) |
| Isobutylene, g. (moles) | 62 (1.11) | 55 (0.98) | 86.5 (1.54) |
| Hydrogen fluoride, g. (moles) | 113 (5.64) | 136 (6.8) | 158 (7.9) |
| Total weight, g. | 398 | 350.5 | 498.5 |
| Temperature, °C | 24 | 24 | 23 |
| Contact time, minutes | 30 | 30 | 30 |
| Products: |  |  |  |
| Hydrogen fluoride layer, g. | 108 | 145 | 173 |
| Wt. of organic layer, g. | 274 | 194 | 310 |
| Isobutane, g. (moles) | 160 | 110 (1.90) | 167 (2.88) |
| Isopentane, g. (moles) | 3 (0.042) | 0 | 0 |
| Methylcyclopentane, g. (moles) | 0 | 0 | 4.1 (0.049) |
| Hexanes, g. (moles) | 1.1 (0.012) | 0 | 1.6 (0.019) |
| Heptanes, g. (moles) | 3.0 (0.03) | 6.1 (0.06) | 2.8 (0.03) |
| Octanes, g. (moles) | 71 (0.62) | 12.7 (0.11) | 16.2 (0.142) |
| Nonanes, g. (moles) | 0.7 (0.06) | 1.4 (0.011) | 2.3 (0.18) |
| Alkylated methylcyclopentane,[1] g. (moles) | 6.5 (0.05) | 37 (0.26) | 70 (0.50) |
| Methylcyclopentane dimer, g. (moles) |  | 7 (0.031) | 14 (0.084) |
| Higher boiling material, g. (moles) |  | 2.5 | 6.5 |
| Residue, g. | 20 | 3 | 12 |
| Percent recovery of total reagents | 93 | 93 | 97 |
| Percent conversion of methylcyclopentane | 100 | 100 | 95.3 |

[1] Mixture of tetramethylcyclohexanes, such as 1,2,4,5 tetramethylcyclohexane.

These data show, first, substantially complete reaction between the isobutane and methylcyclopentane to form alkyl substituted cyclohexanes, which products are inert to the reaction conditions. On consumption of the methylcyclopentane, alkylation of isobutene by the isobutane occurs, as does disproportionation reactions, which reactions produce the various hydrocarbons listed above.

Example 3

Two alkylations were performed in accordance with the procedure of Example 1, in which different isoparaffins were alkylated by methylcyclopentane. The quantities of reactants catalysts, and products obtained are tabulated below:

|  | Reaction 1 | Reaction 2 |
|---|---|---|
| Reactants: |  |  |
| Methylcyclopentane, g. (moles) | 85 (1.01) | 43 (0.512) |
| Isopentane, g. (moles) | 213 (2.96) |  |
| 2-methylpentane, g. (moles) |  | 129 (1.50) |
| Catalysts: |  |  |
| Isobutene, g. (moles) | 61 (1.09) | 76 (1.36) |
| Hydrogen fluoride, g. | 143.5 | 124 |
| Total | 502.5 | 372 |
| Products: |  |  |
| Hydrogen fluoride layer, g. | 150 | 142 |
| Isobutane, g. (moles) | 35.5 (0.613) | 28 (0.483) |
| Isopentane, g. (moles) | 165.5 (2.30) | 1.5 (0.021) |
| Methylcyclopentane, g. (moles) | 13.7 (0.163) | 15 (0.179) |
| Product 1, g. (moles) | [1] 17 (0.110) | [2] 27.2 (0.194) |
| Product 2, g. (moles) | [2] 37 (0.220) | [3] 3.3 (0.021) |
| Product 3, g. (moles) |  | [4] 13.3 (0.079) |
| Methylcyclopentane dimer | 10 (0.060) | 18.6 (0.112) |

[1] Consisted of a mixture of tetramethylcyclohexanes formed by reaction between isobutene and methylcyclopentane.
[2] Consisted of a mixture of ethyltrimethylcyclohexane formed by reaction between isopentane and methylcyclopentane.
[3] Reaction product of methylcyclopentane and a disproportionation product of 2-nethylpentane.
[4] Consisted of a mixture of trimethylpropylcyclohexanes formed by reaction between 2-methylpentane and methylcyclopentane.

These data show that with increasing molecular weight of the isoparaffin an increasingly complex mixture of products is obtained, resulting from reactions such as disproportionation, and less of the desired product is obtained.

Example 4

Following the procedure of Example 1, 61.5 g. (1.10 moles) of isobutene were added, over a period of 15 minutes, to a stirred mixture of 120 g. (2.02 moles) of isobutane, 54 g. (0.55 mole) of methylcyclohexane and 111 g. of hydrogen fluoride, the reaction being performed at ambient temperature about 24° C.

The principal reaction was between the isobutene and isobutane to form octanes. A large portion of the methylcyclohexane (36 g.) was recovered. No alkylated product comparable to the one obtained with methylcyclopentane when used in place of methylcyclohexane, was observed.

Example 5

Example 4 was substantially duplicated by adding 73 g. (1.39 moles) of isobutene-2 to a mixture of 25 g. (0.26 mole) of methylcyclohexane, 213.5 g. of isobutane, and 129 g. of hydrogen fluoride.

As in Example 4, octanes were the principal product (95.5 g.) recovered; 133 g. of isobutane and 18 g. of methylcyclohexane were recovered.

Example 6

The procedure of Example 4 was substantially duplicated, substituting 2-methylpentane (225 g., 2.52 moles) for isobutane. Decanes were the principal product obtained, there being recovered 38.6 g. of methylcyclohexane (from an initial quantity of 49 g.). Here again, none of the recovered product of reaction between methylcyclohexane and the isoparaffin, which would be comparable to the product obtained substituting methylcyclopentane for methylcyclohexane, was observed.

The foregoing examples serve to illustrate the process of the present invention, modifications in which will be apparent to those skilled in the art. For example, continuous operation may be employed, and the rate of olefin addition to the reaction mixture may be varied substantially and good results obtained. Although this rate is not considered critical, it is preferred that for each mole of alkyl substituted cyclopentane present in the reaction mixture, the required amount of olefin be added within from 1 to about 30 minutes, depending somewhat on the efficiency of the agitation of the emulsion.

The invention claimed is:

1. Process for the preparation of a polyalkyl cyclohexane which comprises reacting in liquid phase an alkyl substituted cyclopentane with an isoparaffin having from 4 to 6 carbon atoms and at least one tertiary hydrogen atom per molecule by bringing together, in contact with an admixture of said cyclopentane and said isoparaffin, hydrogen fluoride and an olefin, whereby reaction between said cyclopentane and said isoparaffin occurs to form a polyalkyl cyclohexane having the same number of carbon atoms as the sum of the carbon atoms of said cyclopentane and said isoparaffin and whereby said olefin is converted to a paraffin having the same number of carbon atoms as said olefin, and separating said polyalkyl cyclohexane from the reaction mixture.

2. Process for the preparation of a polyalkyl cyclohexane which comprises introducing, at a temperature of from −10° to 100° C., an olefin into a liquid phase emulsion in hydrogen fluoride of an alkyl substituted cyclopentane and an isoparaffin having from 4 to 6 carbon atoms and at least one tertiary hydrogen atom per molecule, whereby reaction between said cyclopentane and said isoparaffin occurs to form a polyalkyl cyclohexane having the same number of carbon atoms as the sum of the carbon atoms of said cyclopentane and said isoparaffin and whereby said olefin is converted to a paraffin having the same number of carbon atoms as said olefin, and separating the so-formed polyalkyl cyclohexane from the reaction mixture.

3. Process for the preparation of a polyalkyl cyclohexane by reacting isopentane with methylcyclopentane which comprises introducing, at a temperature of from 0° C. to 30° C., propene into a stirred liquid emulsion in hydrogen fluoride of isopentane and methylcyclopentane, the molar ratio of propene to methylcyclopentane being from 0.1 to 2, and the molar ratio of isopentane to methylcyclopentane being from 1 to 30, whereby reaction between said isopentane and said methylcyclopentane occurs to form a polyalkylcyclohexane having the same number of carbon atoms as the sum of the carbon atoms of isopentane and methylcyclohexane and whereby said propene is converted to propane, and separating the so-formed polyalkyl cyclohexane from the reaction mixture.

4. Process for the preparation of a polyalkyl cyclohexane by reacting isobutane with methylcyclopentane which comprises introducing, at a temperature of from 0° C. to 30° C., isobutene into a stirred liquid emulsion in hydrogen fluoride of isobutane and methylcyclopropane, the molar ratio of isobutene to methylcyclopentane being from 0.1 to 2 and the molar ratio of isobutane to methylcyclopentane being from 1 to 30, whereby reaction between said isobutane and said methylcyclopentane occurs to form a polyalkylcyclohexane having the same number of carbon atoms as the sum of the carbon atoms of isobutane and methylcyclopentane and whereby said isobutene is converted to isobutane, and separating the so-formed polyalkyl cyclohexane from the reaction mixture.

5. Process for removing alkyl substituted cyclopentanes from a gasoline fraction containing the same together with isoparaffins having from 4 to 6 carbon atoms and at least one tertiary hydrogen atom per molecule, which comprises bringing together hydrogen fluoride and an olefin in the presence of said gasoline fraction in liquid phase, whereby said cyclopentanes react with said isoparaffins to form polyalkyl cyclohexanes having the same number of carbon atoms as the sum of the carbon atoms of said cyclopentanes and said isoparaffins and whereby said olefin is converted to a paraffin having the same number of carbon atoms as said olefin, and separating the so-formed polyalkyl cyclohexanes from the gasoline fraction.

6. Process for removing alkyl substituted cyclopentanes from a gasoline fraction containing the same together with isoparaffins having at least one tertiary hydrogen atom per molecule, which comprises bringing together hydrogen fluoride and an olefin in the presence of said gasoline fraction in liquid phase, whereby said cyclopentanes react with said isoparaffins to form polyalkyl cyclohexanes having the same number of carbon atoms as the sum of the carbon atoms of said cyclopentanes and said isoparaffins and whereby said olefin is converted to a paraffin having the same number of carbon atoms as said olefin, and separating the so-formed polyalkyl cyclohexanes from the gasoline fraction.

7. Process according to claim 1 wherein the isoparaffin is isobutane.

8. Process according to claim 1 wherein the isoparaffin is isopentane.

9. Process according to claim 1 wherein the alkyl substituted cyclopentane is methylcyclopentane.

10. Process according to claim 2 wherein the olefin is propene.

11. Process according to claim 2 wherein the olefin is butene-1.

12. Process according to claim 2 wherein the olefin is butene-2.

13. Process according to claim 2 wherein the olefin is isobutene.

ABRAHAM SCHNEIDER.

References Cited in the file of this patent

UNITED STATES PATENTS

| Number | Name | Date |
| --- | --- | --- |
| 2,315,078 | Pines et al. | Mar. 30, 1943 |
| 2,372,338 | Penisten | Mar. 27, 1945 |
| 2,379,368 | Matuszak | June 26, 1945 |
| 2,385,300 | Pines et al. | Sept. 18, 1945 |
| 2,391,148 | Frey | Dec. 18, 1945 |